United States Patent
Wakimoto (10) Patent No.: US 12,476,338 B2
(45) Date of Patent: *Nov. 18, 2025

(54) SECONDARY BATTERY

(71) Applicant: SANYO Electric Co., Ltd., Osaka (JP)

(72) Inventor: Ryoichi Wakimoto, Hyogo (JP)

(73) Assignee: SANYO ELECTRIC CO., LTD., Osaka (JP)

(*) Notice: Subject to any disclaimer, the term of this patent is extended or adjusted under 35 U.S.C. 154(b) by 692 days.

This patent is subject to a terminal disclaimer.

(21) Appl. No.: 17/634,462

(22) PCT Filed: Sep. 11, 2020

(86) PCT No.: PCT/JP2020/034401
§ 371 (c)(1),
(2) Date: Feb. 10, 2022

(87) PCT Pub. No.: WO2021/060006
PCT Pub. Date: Apr. 1, 2021

(65) Prior Publication Data
US 2022/0320572 A1  Oct. 6, 2022

(30) Foreign Application Priority Data

Sep. 26, 2019  (JP) .................. 2019-175445

(51) Int. Cl.
*H01M 50/583* (2021.01)
*H01M 10/058* (2010.01)
(Continued)

(52) U.S. Cl.
CPC ....... *H01M 50/583* (2021.01); *H01M 10/058* (2013.01); *H01M 50/188* (2021.01); *H01M 50/502* (2021.01); *H01M 50/533* (2021.01)

(58) Field of Classification Search
CPC .................................................. H01M 50/583
See application file for complete search history.

(56) References Cited

U.S. PATENT DOCUMENTS 10,128,484 B2   11/2018  Kim
2012/0258356 A1*  10/2012  Kim ................. H01M 50/528
                                                     429/179
(Continued)

FOREIGN PATENT DOCUMENTS

CN   109088040 A   12/2018
EP     2393145 B1    5/2013
(Continued)

OTHER PUBLICATIONS

Extended European Search Report dated Sep. 21, 2023 issued in the corresponding European Patent Application No. 20867709.6.
(Continued)

*Primary Examiner* — Keith Walker
*Assistant Examiner* — Jacky Yuen
(74) *Attorney, Agent, or Firm* — Rimon P.C.

(57) ABSTRACT

A secondary battery includes an external terminal provided outside a sealing plate of an exterior body, a connection member provided inside the sealing plate and connected to the external terminal, a current collector connected to the connection member, and a current collector tab connected to an electrode body. The current collector has, along a longitudinal direction of the sealing plate, a first connection region connected to the current collector tab, a second connection region connected to the connection member, and a fuse region provided on a current path from the first connection region to the second connection region. In the longitudinal direction of the sealing plate, the first connection region is positioned inside the external terminal, and the fuse region is positioned at a position identical to a position of the external terminal or outside the external terminal.

6 Claims, 10 Drawing Sheets

(51) Int. Cl.
    *H01M 50/188*     (2021.01)
    *H01M 50/502*     (2021.01)
    *H01M 50/533*     (2021.01)

(56) References Cited

U.S. PATENT DOCUMENTS

| | | |
|---|---|---|
| 2013/0266830 A1 | 10/2013 | Byun et al. |
| 2015/0086847 A1* | 3/2015 | Minagata .............. H01M 50/54 |
| | | 429/162 |
| 2017/0162852 A1 | 6/2017 | Guen |
| 2018/0358648 A1 | 12/2018 | Guen |
| 2018/0375162 A1 | 12/2018 | Wakimoto et al. |
| 2019/0305288 A1* | 10/2019 | Jang .................... H01M 50/103 |
| 2021/0280952 A1* | 9/2021 | Wakimoto ............ H01M 50/15 |

FOREIGN PATENT DOCUMENTS

| | | | |
|---|---|---|---|
| EP | 3416213 A2 | 12/2018 | |
| JP | 2004-311073 A | 11/2004 | |
| JP | 2013-219003 A | 10/2013 | |
| JP | 2019-009015 A | 1/2019 | |
| WO | WO-2018021372 A1 * | 2/2018 | ............ H01M 10/04 |

OTHER PUBLICATIONS

International Search Report issued in International Patent Application No. PCT/JP2020/034401, dated Nov. 24, 2020, with English translation.

\* cited by examiner

SECONDARY BATTERY

CROSS-REFERENCE OF RELATED APPLICATIONS

This application is the U.S. National Phase under 35 U.S.C. § 371 of International Patent Application No. PCT/JP2020/034401, filed on Sep. 11, 2020, which in turn claims the benefit of Japanese Application No. 2019-175445, filed on Sep. 26, 2019, the entire disclosures of which Applications are incorporated by reference herein.

TECHNICAL FIELD

The present disclosure relates to a secondary battery.

BACKGROUND ART

As a current collection structure of a secondary battery configured such that an electrode body is housed in an exterior body, a structure has been known, in which a current collector tab extending from the electrode body toward a sealing plate of the exterior body is connected to an external terminal through a current collector.

Regarding such a current collection structure, Patent Document 1 discloses such a technique that a fuse region is provided at the current collector and the safety of the secondary battery is ensured by fusing of the fuse region when overcurrent flows in the secondary battery.

CITATION LIST

Patent Document

PATENT DOCUMENT 1: Japanese Unexamined Patent Publication No. 2013-219003

SUMMARY OF THE INVENTION

In the above-described current collection structure, the current collector has, along a longitudinal direction of the sealing plate, a region connected to the current collector tab and a region connected to the external terminal. For fusing the fuse region when overcurrent flows in the secondary battery, the fuse region needs to be provided between the region connected to the current collector tab and the region connected to the external terminal.

Meanwhile, for increasing the output of the secondary battery, it is effective to expand the width of the current collector tab in the longitudinal direction of the sealing plate. For expanding the width of the current collector tab, the region of the current collector connected to the current collector tab needs to be expanded. As a result, for ensuring the fuse region, the position of the external terminal connected to the current collector needs to be close to an end portion of the sealing plate in the longitudinal direction thereof.

In the case of forming a battery pack such that a plurality of secondary batteries is arranged next to each other, the plurality of secondary batteries is held by a zip tie wound along an array direction. In this case, the zip tie is wound around an end portion of the sealing plate, and for this reason, the external terminal is preferably apart from the end portion of the sealing plate.

Thus, the technique of expanding the width of the current collector tab to increase the output of the secondary battery and the technique of holding the plurality of secondary batteries by the zip tie to form the battery pack are in conflict with each other regarding arrangement of the terminal, and it is difficult to employ both of these techniques.

A secondary battery of the present disclosure includes an electrode body including a positive electrode plate and a negative electrode plate, an exterior body having an opening and housing the electrode body, a sealing plate sealing the opening, an external terminal provided outside the sealing plate, a connection member provided inside the sealing plate and connected to the external terminal, a current collector disposed inside the sealing plate and connected to the connection member, and a current collector tab connected to the positive electrode plate or the negative electrode plate at an end portion of the electrode body adjacent to the sealing plate. The current collector has, along a longitudinal direction of the sealing plate, a first connection region connected to the current collector tab, a second connection region connected to the connection member, and a fuse region provided on a current path from the first connection region to the second connection region. In the longitudinal direction of the sealing plate, the first connection region is positioned inside the external terminal, and the fuse region is positioned at a position identical to a position of the external terminal or outside the external terminal.

According to the present disclosure, a high-power secondary battery having a fuse region at a current collector can be provided so that a battery pack can be easily formed of these secondary batteries.

DESCRIPTION OF EMBODIMENT

Hereinafter, an embodiment of the present disclosure will be described in detail with reference to the drawings. Note that the present disclosure is not limited to the following embodiment. Further, changes can be made as necessary without departing from a scope in which advantageous effects of the present disclosure are provided.

Figure 1:
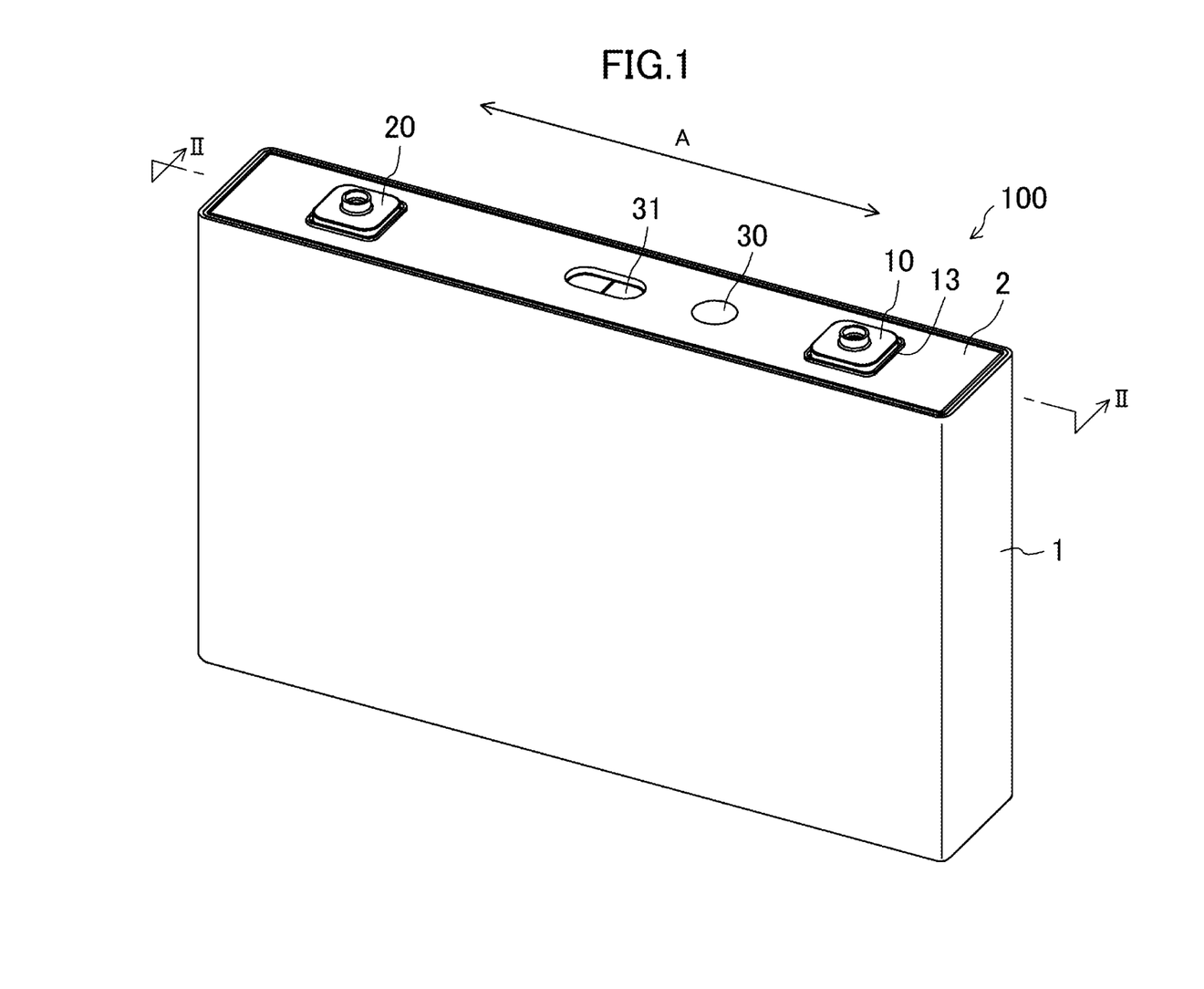
FIG. 1 is a perspective view schematically showing the configuration of a secondary battery in one embodiment of the present disclosure.

FIG. 1 is a perspective view schematically showing the configuration of a secondary battery according to one embodiment of the present disclosure. Moreover, FIG. 2 is a sectional view taken along line II-II of FIG. 1.

Figure 2:
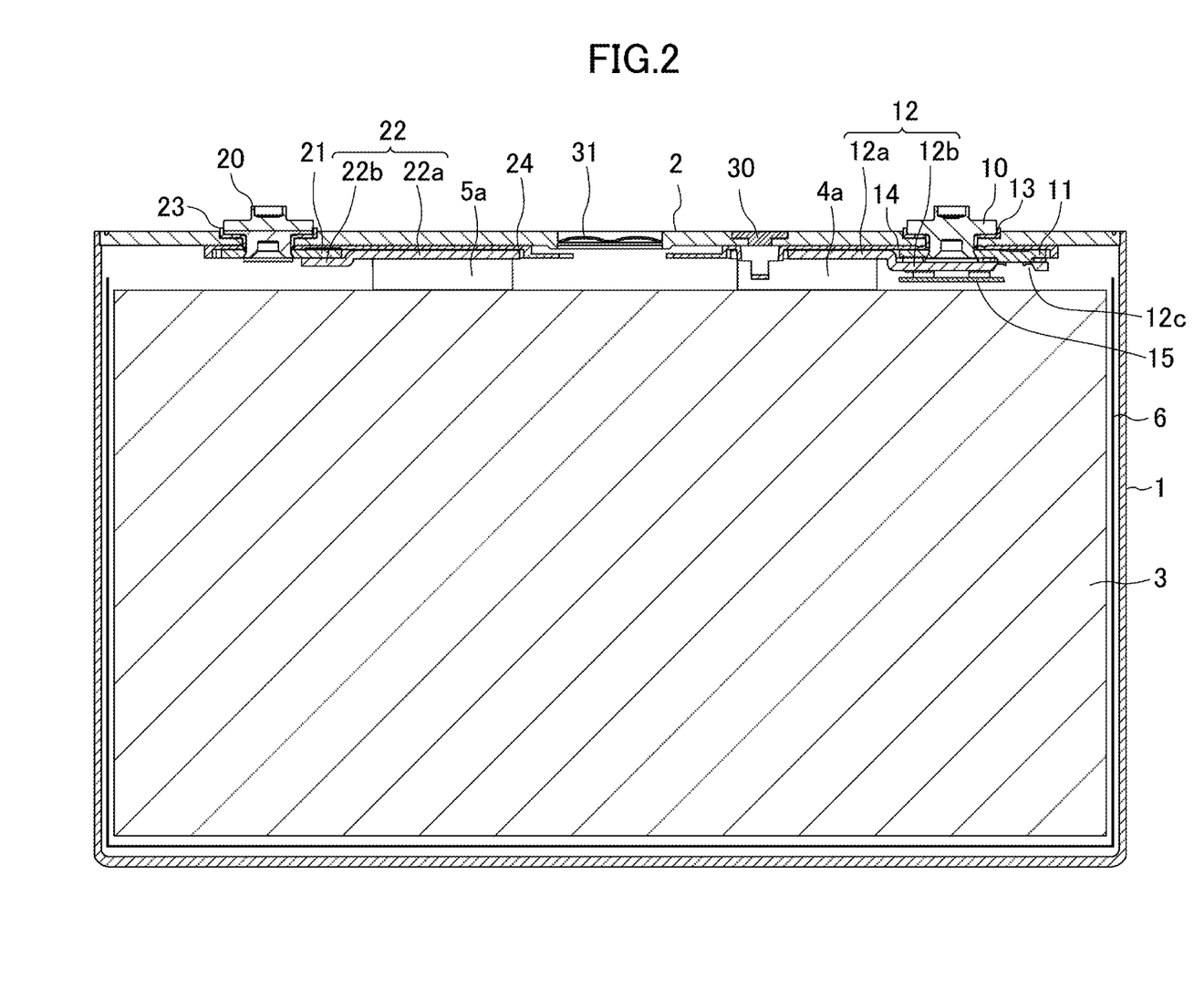
FIG. 2 is a sectional view taken along line II-II of FIG. 1.

As shown in FIGS. 1 and 2, a secondary battery 100 in the present embodiment includes an exterior body 1 having an opening and housing an electrode body 3 and a sealing plate 2 sealing the opening of the exterior body 1. The exterior body 1 and the sealing plate 2 are made of aluminum or aluminum alloy, for example. A positive electrode external terminal 10 and a negative electrode external terminal 20 are provided outside the sealing plate 2. The electrode body 3 has such a structure that a positive electrode plate and a negative electrode plate are stacked or wound with a separator being interposed therebetween. Note that in the present embodiment, a longitudinal direction of the sealing plate 2 indicates the direction of an arrow A in FIG. 1.

A positive electrode connection member 11 and a negative electrode connection member 21 respectively connected to the positive electrode external terminal 10 and the negative electrode external terminal 20 are provided inside the sealing plate 2. Further, a positive electrode current collector 12 and a negative electrode current collector 22 respectively connected to the positive electrode connection member 11 and the negative electrode connection member 21 are provided inside the sealing plate 2.

The electrode body 3 has, at an end portion thereof adjacent to the sealing plate 2, a positive electrode current collector tab 4a and a negative electrode current collector tab 5a respectively connected to the positive electrode plate and the negative electrode plate. Moreover, the positive electrode current collector tab 4a and the negative electrode current collector tab 5a are respectively connected to the positive electrode current collector 12 and the negative electrode current collector 22.

The positive electrode external terminal 10, the positive electrode connection member 11, and the positive electrode current collector 12 are made of aluminum or aluminum alloy, for example. The negative electrode external terminal 20, the negative electrode connection member 21, and the negative electrode current collector 22 are made of copper or copper alloy, for example.

A first insulating member 13 is arranged between the positive electrode external terminal 10 and the sealing plate 2, and a first insulating member 23 is arranged between the negative electrode external terminal 20 and the sealing plate 2. Moreover, a second insulating member 14 is arranged between the positive electrode connection member 11 and the sealing plate 2, and a second insulating member 24 is arranged between the negative electrode connection member 21 and the sealing plate 2. With this configuration, each of the positive electrode external terminal 10, the negative electrode external terminal 20, the positive electrode connection member 11, and the negative electrode connection member 21 is electrically insulated from the sealing plate 2.

The sealing plate 2 is provided with a liquid injection hole (not shown) for injecting an electrolytic solution, and the liquid injection hole is sealed with a sealing member 30. The sealing plate 2 is provided with a gas discharge valve 31, and when the internal pressure of the exterior body 1 reaches a predetermined value or greater, gas in the exterior body 1 is discharged to the outside through the broken gas discharge valve 31. An insulating electrode body holder 6 is arranged between the exterior body 1 and the electrode body 3.

Next, the method for assembling the secondary battery in the present embodiment and details of each configuration will be described with reference to FIGS. 3A to 8.

Figure 3A:
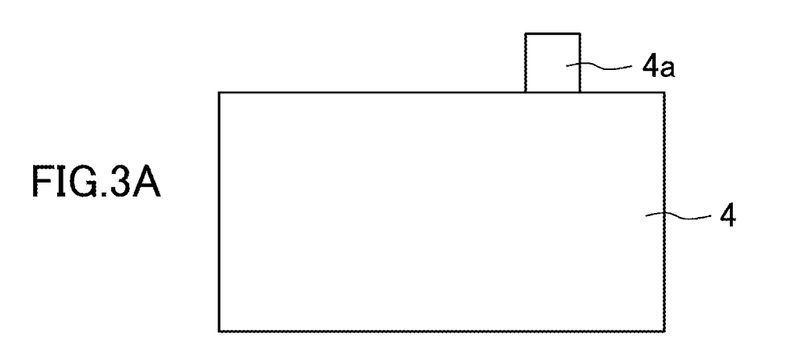
FIG. 3A is a plan view of a positive electrode plate.

FIG. 3A is a plan view of the positive electrode plate 4. The positive electrode plate 4 has such a configuration that positive electrode mixture layers containing a positive electrode active material are formed on both surfaces of a positive electrode core. The positive electrode current collector tab 4a protrudes from an end side of the positive electrode plate 4. The positive electrode current collector tab 4a may be part of the positive electrode core, or may be another member. The positive electrode core is made of aluminum foil or aluminum alloy foil, for example. Moreover, the positive electrode active material is made of lithium-transition metal composite oxide, for example.

Figure 3B:
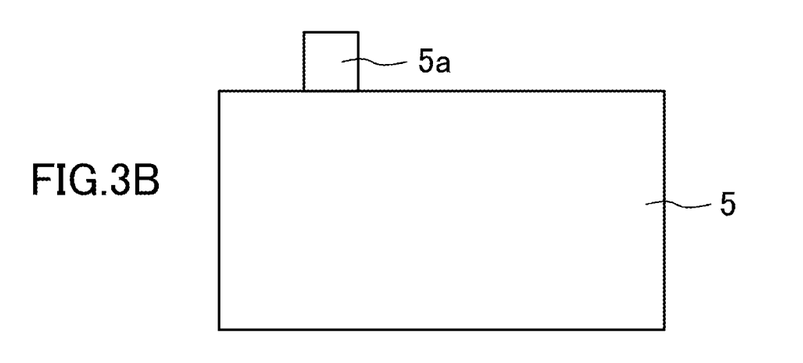
FIG. 3B is a plan view of a negative electrode plate.

FIG. 3B is a plan view of the negative electrode plate 5. The negative electrode plate 5 has such a configuration that negative electrode mixture layers containing a negative electrode active material are formed on both surfaces of a negative electrode core. The negative electrode current collector tab 5a protrudes from an end side of the negative electrode plate 5. The negative electrode current collector tab 5a may be part of the negative electrode core, or may be another member. The negative electrode core is made of copper foil or copper alloy foil, for example. Moreover, the negative electrode active material is made of a carbon material or a silicon-containing material, for example.

Figure 3C:
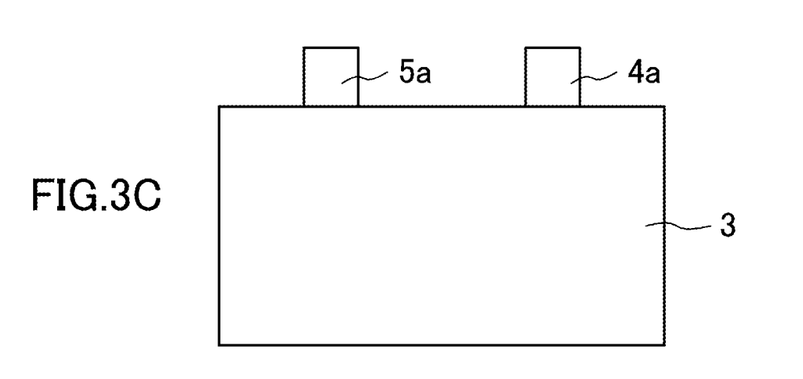
FIG. 3C is a plan view of an electrode body.

FIG. 3C is a plan view of the electrode body 3. The electrode body 3 has such a configuration that a plurality of positive electrode plates 4 and a plurality of negative electrode plates 5 are stacked or wound with a separator being interposed between adjacent ones of the plates 4, 5. A plurality of positive electrode current collector tabs 4a and a plurality of negative electrode current collector tabs 5a protrude from an end side of the electrode body 3.

Figure 4:
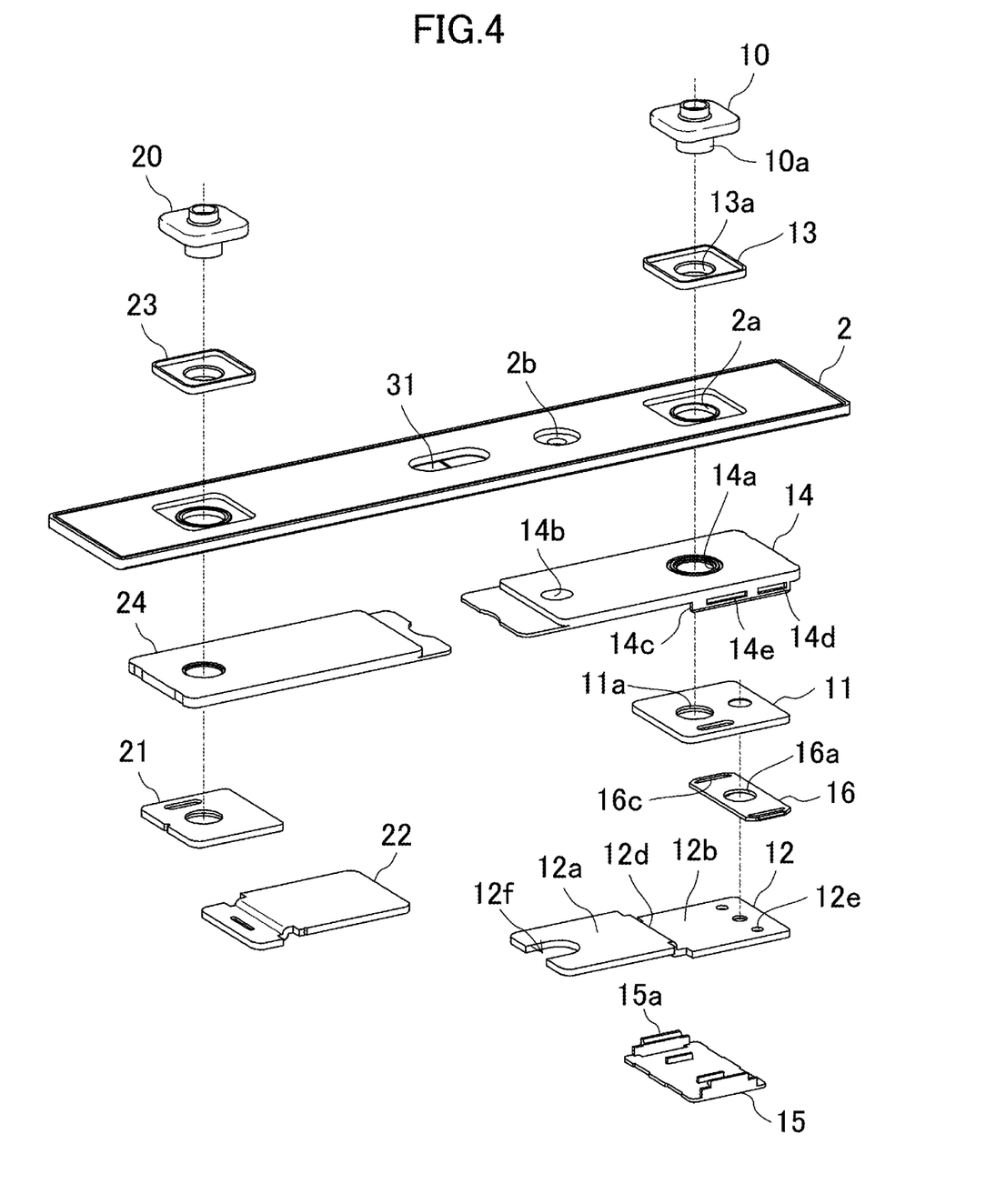
FIG. 4 is an exploded perspective view of each configuration of the secondary battery other than an exterior body and the electrode body.
Figure 5:
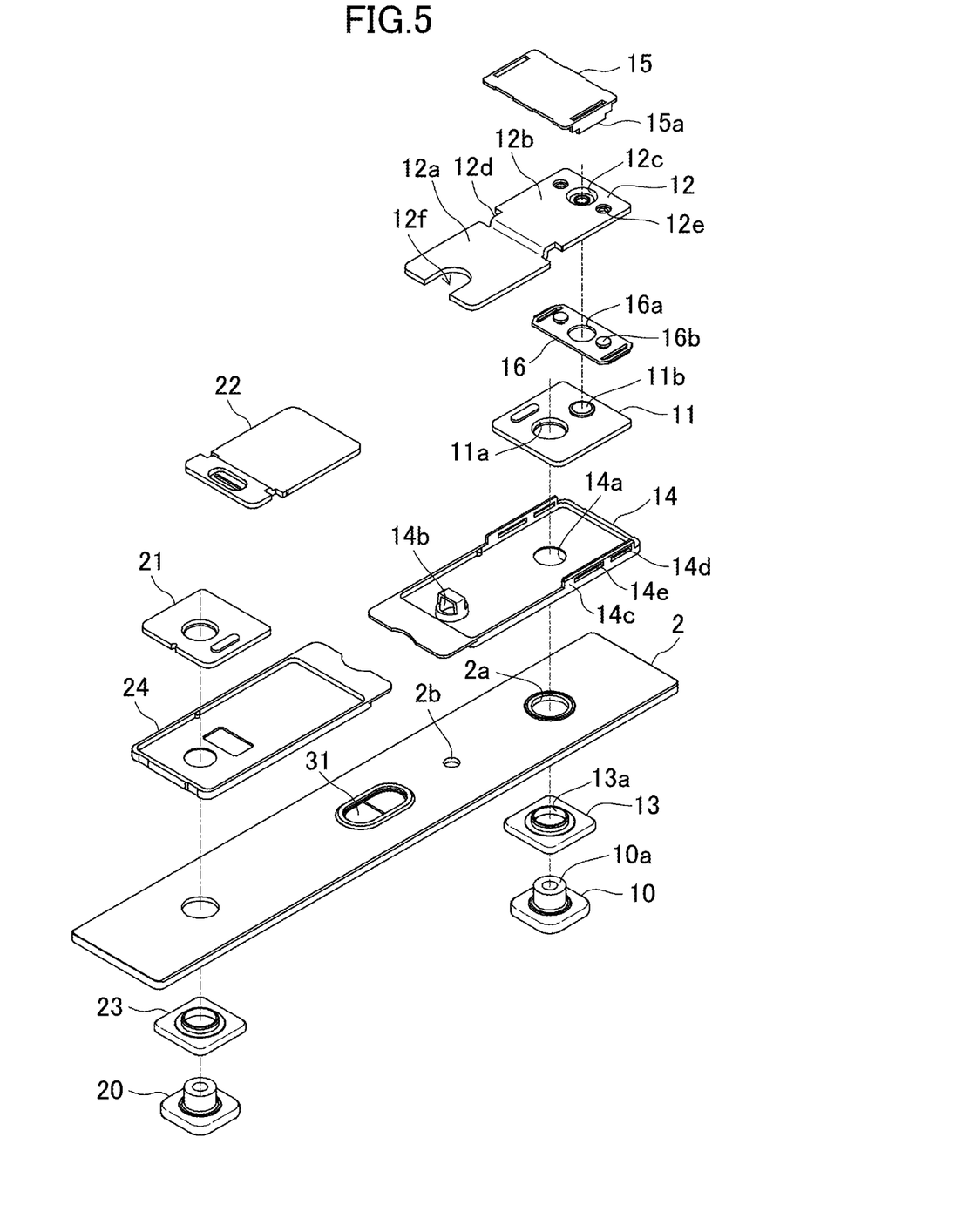
FIG. 5 is an exploded perspective view of each configuration of the secondary battery other than the exterior body and the electrode body.

FIGS. 4 and 5 are exploded perspective views of each configuration of the secondary battery other than the exterior body 1 and the electrode body 3. Here, FIG. 4 is a perspective view from the upper side of the sealing plate 2, and FIG. 5 is an exploded perspective view from the lower side of the sealing plate 2. Note that each configuration on a positive electrode side will be described below and each configuration on a negative electrode side will be described as necessary.

As shown in FIGS. 4 and 5, the positive electrode external terminal 10 and the first insulating member 13 are arranged on the upper side of the sealing plate 2. On the lower side of the sealing plate 2, the second insulating member 14, the positive electrode connection member 11, a fuse cover 16, the positive electrode current collector 12, and an insulating cover member 15 are arranged.

The positive electrode external terminal 10 has a cylindrical protruding portion 10a. The first insulating member 13, the sealing plate 2, the second insulating member 14, and the positive electrode connection member 11 are respectively provided with through-holes 13a, 2a, 14a, and 11a through which the protruding portion 10a of the positive electrode external terminal 10 penetrates.

The sealing plate 2 has a liquid injection hole 2b for injecting an electrolytic solution. The second insulating member 14 is provided with an opening 14b at such a position that the liquid injection hole 2b is not closed. Moreover, the second insulating member 14 has wall portions 14c along the longitudinal direction of the sealing plate 2, and openings 14d, 14e for fixing the fuse cover 16 and the cover member 15 are provided at the wall portions 14c.

The positive electrode current collector 12 has, along the longitudinal direction of the sealing plate 2, a first connection region 12a connected to the positive electrode current collector tab 4a and a second connection region 12b connected to the positive electrode connection member 11. Moreover, the positive electrode current collector 12 has a fuse region 12c in a current path from the first connection region 12a to the second connection region 12b. In the present embodiment, the fuse region 12c includes an annular thinner portion than other regions of the positive electrode current collector 12.

The positive electrode current collector 12 has a step portion 12d between the first connection region 12a and the second connection region 12b, and the first connection region 12a is positioned closer to the sealing plate 2 than the second connection region 12b is. The positive electrode current collector 12 is provided with a cutout portion 12f at such a position that the liquid injection hole 2b is not closed.

Note that the negative electrode side does not have configurations corresponding to the fuse cover 16 and the cover member 15. Moreover, the negative electrode current collector 22 does not have a region corresponding to the fuse region 12c.

Figure 6:
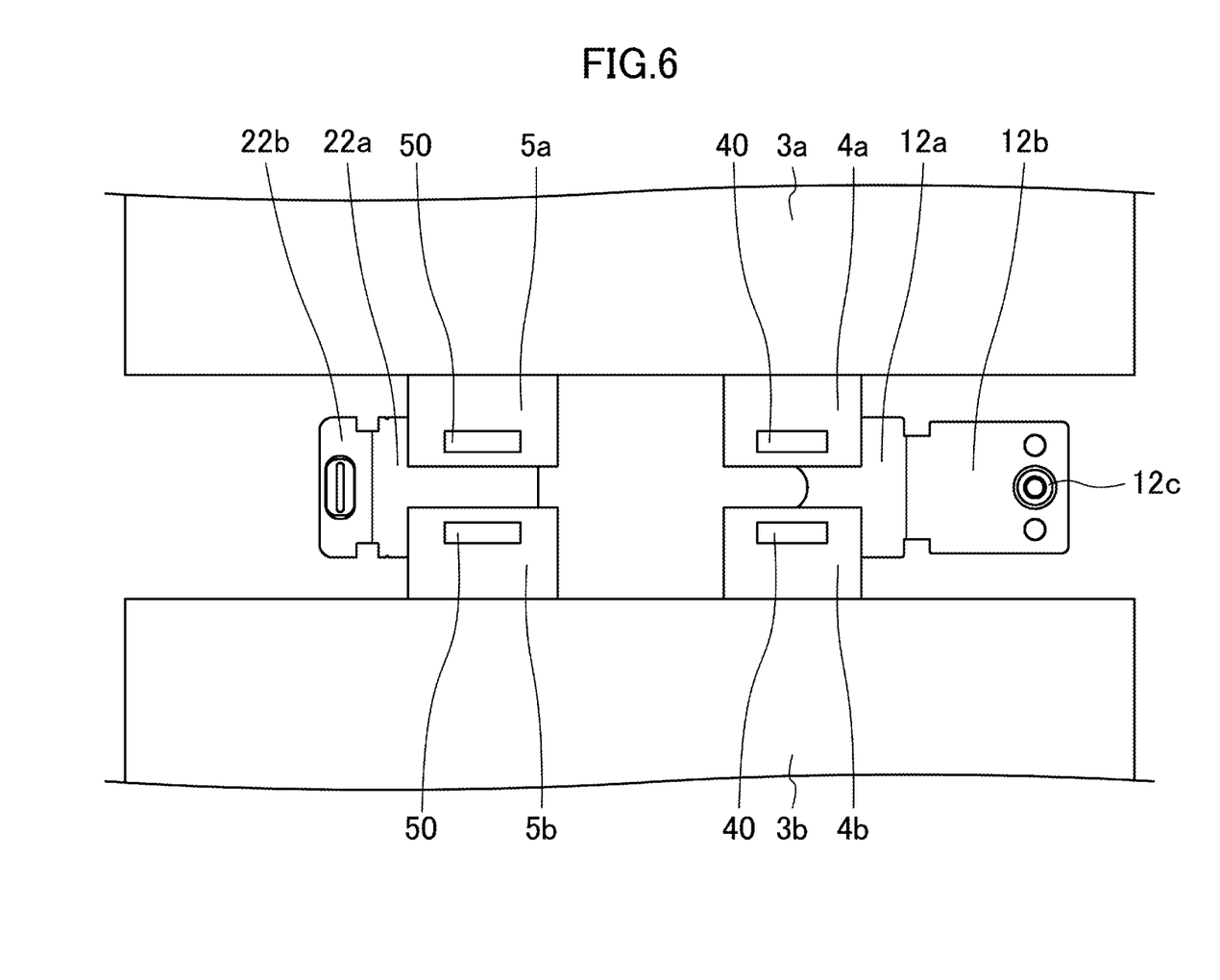
FIG. 6 is a plan view showing a state in which positive electrode current collector tabs are connected to a positive electrode current collector and negative electrode current collector tabs are connected to a negative electrode current collector.

FIG. 6 is a plan view showing a state in which the positive electrode current collector tab 4a and the positive electrode current collector tab 4b respectively provided at two electrode bodies 3a, 3b having the same configuration are connected to the positive electrode current collector 12, and the negative electrode current collector tab 5a and the negative electrode current collector tab 5b respectively provided at the two electrode bodies 3a, 3b are connected to the negative electrode current collector 22.

Specifically, as shown in FIG. 6, these two electrode bodies 3a, 3b are arranged such that the positive electrode current collector tabs 4a, 4b face each other and the negative electrode current collector tabs 5a, 5b face each other. Then, the positive electrode current collector tabs 4a, 4b are arranged on the first connection region 12a of the positive electrode current collector 12 to be welded to the positive electrode current collector 12 at a welding location 40, and the negative electrode current collector tabs 5a, 5b are arranged on the first connection region 22a of the negative electrode current collector 22 to be welded to the negative electrode current collector 22 at a welding location 50. Welding can be performed using, e.g., ultrasonic welding, resistance welding, or laser welding.

Note that the two electrode bodies 3a, 3b are housed in the exterior body 1 with the positive electrode current collector tabs 4a, 4b and the negative electrode current collector tabs 5a, 5b being bent and the electrode bodies 3a, 3b being arranged in parallel with each other.

Figure 7:
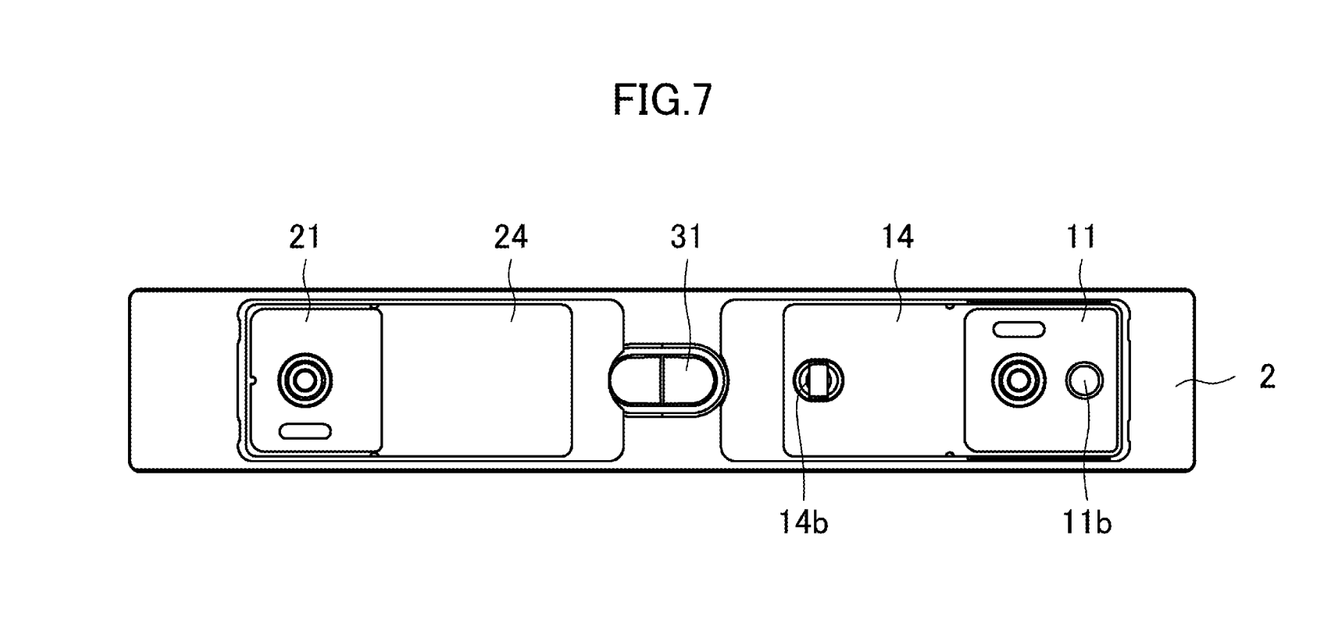
FIG. 7 is a plan view showing, from the lower side of a sealing plate, a state in which a positive electrode external terminal, a negative electrode external terminal, a positive electrode connection member, and a negative electrode connection member are assembled with the sealing plate.

FIG. 7 is a plan view showing, from the lower side of the sealing plate 2, a state in which the positive electrode external terminal 10, the negative electrode external terminal 20, the positive electrode connection member 11, and the negative electrode connection member 21 are assembled with the sealing plate 2.

Specifically, as shown in FIGS. 4 and 5, the first insulating member 13, the sealing plate 2, the second insulating member 14, and the positive electrode connection member 11 are arranged such that the positions of the through-holes 13a, 2a, 14a, and 11a respectively provided at the first insulating member 13, the sealing plate 2, the second insulating member 14, and the positive electrode connection member 11 are aligned with each other. Then, the protruding portion 10a of the positive electrode external terminal 10 is inserted into the through-holes 13a, 2a, 14a, and 11a, and a tip portion of the protruding portion 10a is crimped onto the positive electrode connection member 11 to fix the positive electrode external terminal 10 and the positive electrode connection member 11 to the sealing plate 2. Note that at the crimped portion, the positive electrode external terminal 10 and the positive electrode connection member 11 may be further welded to each other. The negative electrode external terminal 20 and the negative electrode connection member 21 are also fixed to the sealing plate 2 by a similar method.

Figure 8:
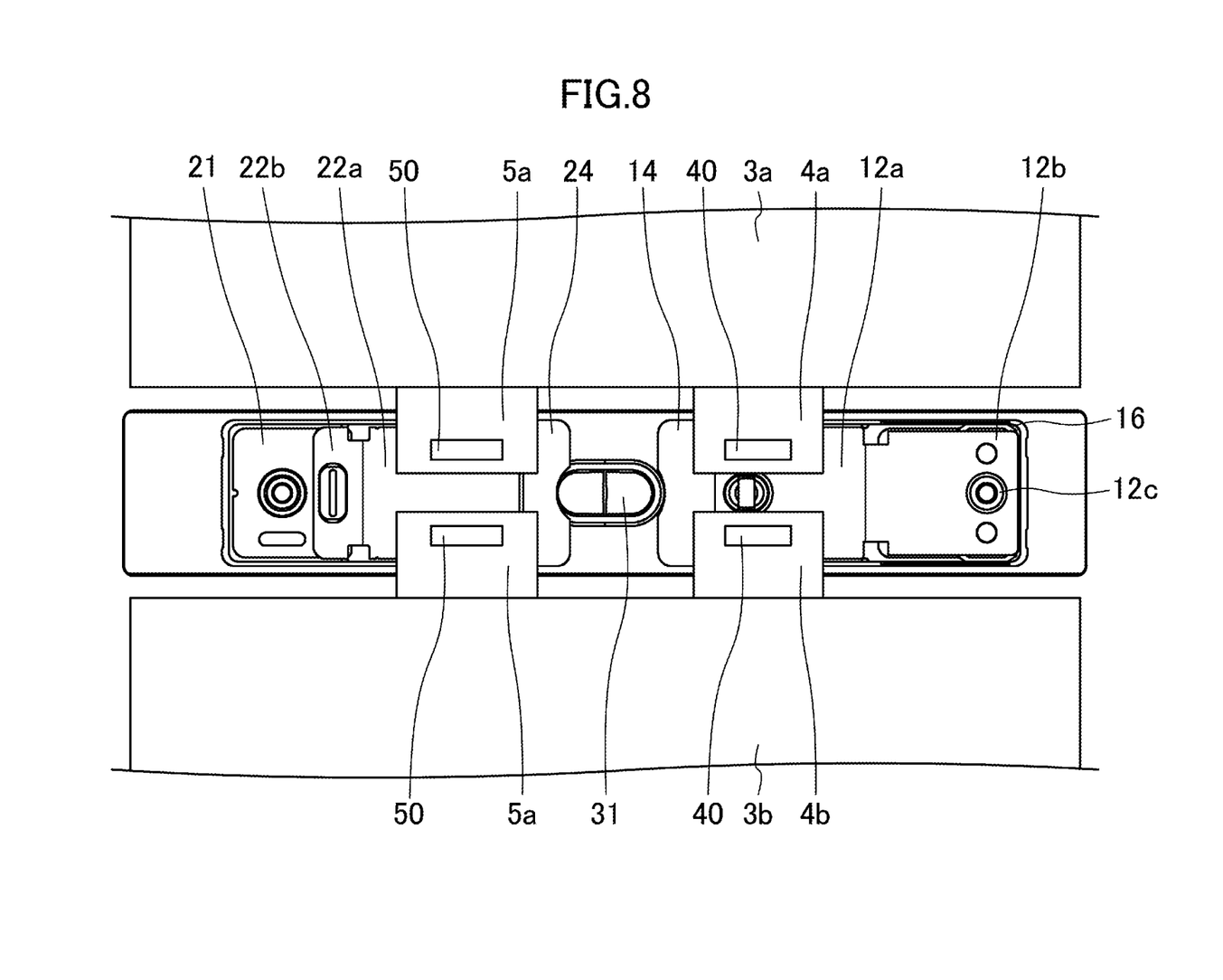
FIG. 8 is a plan view showing a state in which the positive electrode current collector and the negative electrode current collector in the state shown in FIG. 6 are respectively connected to the positive electrode connection member and the negative electrode connection member in the state shown in FIG. 7.
Figure 9A:
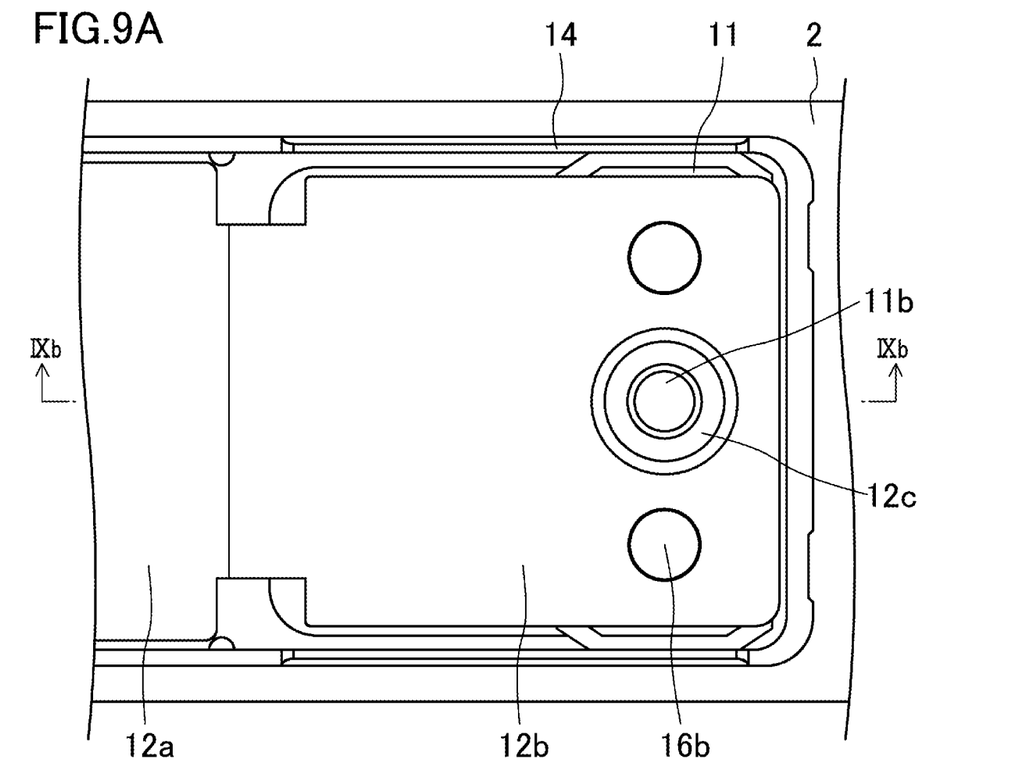
FIG. 9A is an enlarged plan view of a region on a positive electrode external terminal side in FIG. 8.
Figure 9B:
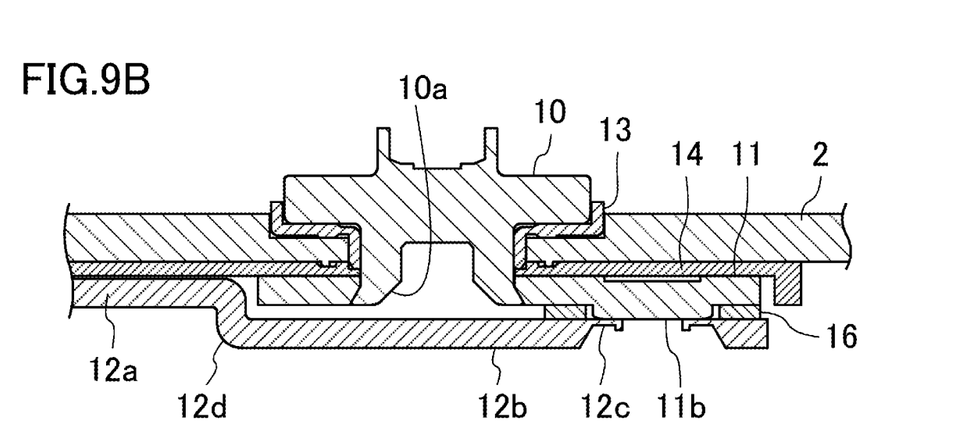
FIG. 9B is a sectional view taken along line IXb-IXb of FIG. 9A.

FIG. 8 is a plan view showing a state in which the positive electrode current collector 12 and the negative electrode current collector 22 in the state shown in FIG. 6 are respectively connected to the positive electrode connection member 11 and the negative electrode connection member 21 in the state shown in FIG. 7. FIG. 9A is an enlarged plan view of the vicinity of the positive electrode external terminal 10 in FIG. 8, and FIG. 9B is a sectional view taken along line IXb-IXb of FIG. 9A.

Specifically, as shown in FIGS. 4 and 5, protrusions 16b provided on the fuse cover 16 are inserted into through-holes 12e provided at the positive electrode current collector 12, and a tip end of the protrusion 16b is crimped to fix the fuse cover 16 to the positive electrode current collector 12. Thereafter, the positive electrode current collector 12 is welded to the positive electrode connection member 11 in the second connection region 12b of the positive electrode current collector 12. Welding can be performed using, e.g., laser welding. Note that the negative electrode current collector 22 is similarly welded to the negative electrode connection member 21 in the second connection region 22b of the negative electrode current collector 22.

In the present embodiment, the fuse region 12c including the annular thinner portion is formed in the second connection region 12b. Moreover, a cylindrical protrusion 11b is formed on the positive electrode connection member 11. Thus, as shown in FIG. 9B, the positive electrode current collector 12 is welded to the protrusion 11b of the positive electrode connection member 11 at the thinner portion.

The fuse cover 16 is formed with a through-hole 16a having a greater diameter than the protrusion 11b. With this configuration, the positive electrode current collector 12 can be welded to the positive electrode connection member 11 with the fuse cover 16 being arranged between the positive electrode current collector 12 and the positive electrode connection member 11.

Moreover, as shown in FIG. 4, the fuse cover 16 is provided with ribs 16c. With this configuration, the fuse cover 16 can be fixed by the second insulating member 14 in such a manner that the ribs 16c are fitted in the openings 14d provided at the second insulating member 14.

Note that the negative electrode current collector 22 is connected to the negative electrode connection member 21 by, e.g., welding by a normal method.

As described above, in the present embodiment, the first connection region 12a of the positive electrode current collector 12 is positioned inside the positive electrode external terminal 10 in the longitudinal direction of the sealing plate 2 as shown in FIGS. 2 and 9B. Moreover, the fuse region 12c of the positive electrode current collector 12 is positioned outside the positive electrode external terminal 10 in the longitudinal direction of the sealing plate 2.

With this configuration, an end portion of the first connection region 12a can be extended to the vicinity of the positive electrode external terminal 10. Thus, the width of the positive electrode current collector tab 4a connected to the first connection region 12a can be expanded. As a result, a high-power secondary battery can be achieved.

Figure 10:
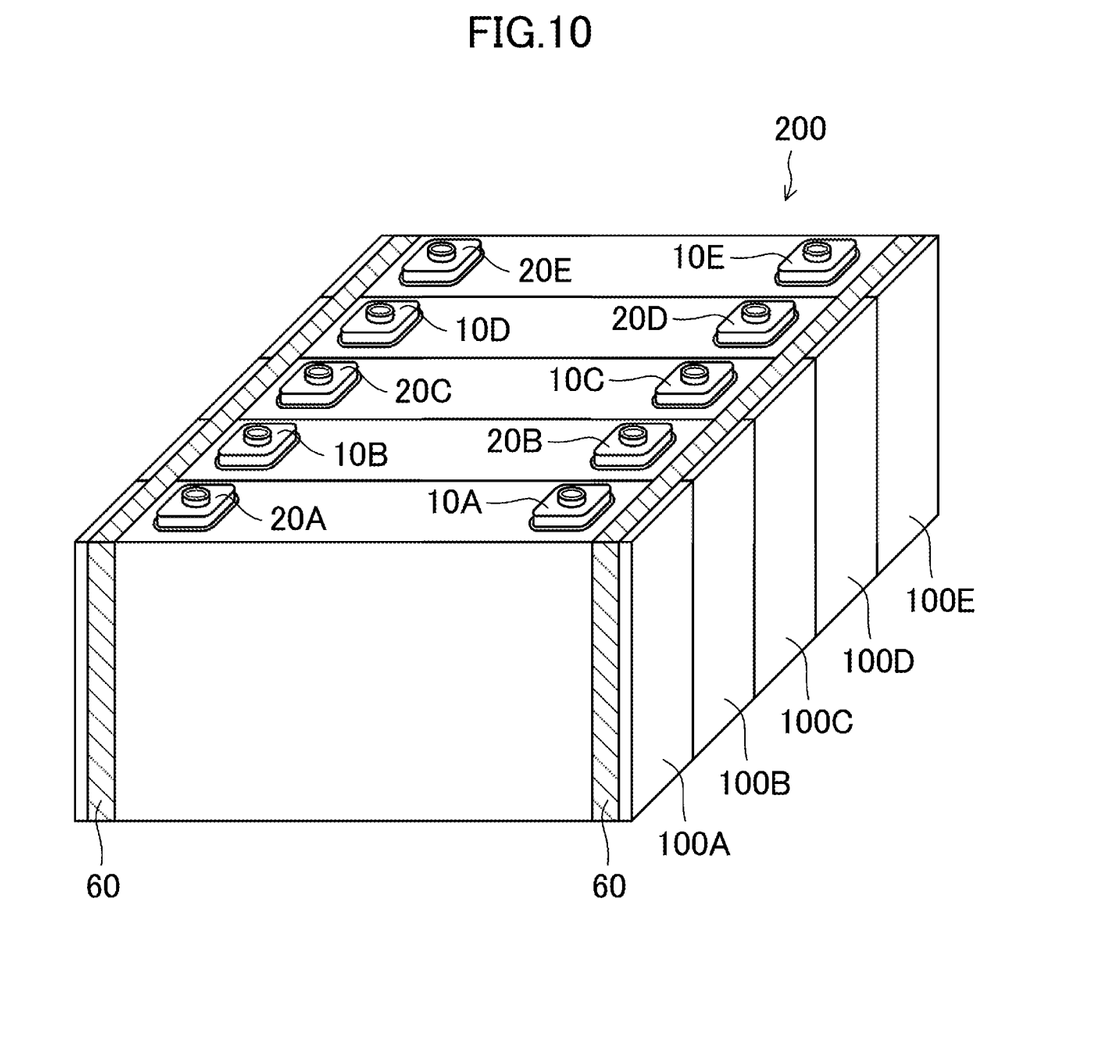
FIG. 10 is a perspective view of a battery pack configured such that a plurality of secondary batteries is arranged next to each other.

On the other hand, since the fuse region 12c of the positive electrode current collector 12 is positioned outside the positive electrode external terminal 10, it is not necessary to position the positive electrode external terminal 10 close to the end portion of the sealing plate in the longitudinal direction for ensuring the fuse region 12c. Thus, in the case of forming a battery pack 200 such that a plurality of secondary batteries 100A to 100E is arranged next to each other as shown in FIG. 10, the plurality of secondary batteries 100A to 100E can be held at both end portions of the sealing plate by means of zip ties 60. As a result, a highly-safe secondary battery can be achieved so that a battery pack can be easily formed of these secondary batteries.

In the present embodiment, when overcurrent flows in the positive electrode current collector 12, the annular thinner portion (the fuse region 12c) is fused such that a current path between the positive electrode current collector 12 and the positive electrode connection member 11 is blocked. However, there is a probability that conduction is made again due to re-contact of the fused thinner portion with the positive electrode connection member 11.

In the present embodiment, as shown in FIGS. 9A and 9B, the fuse cover 16 is disposed between the positive electrode current collector 12 and the positive electrode connection member 11 in the vicinity of the fuse region 12c. This can prevent re-conduction between the positive electrode current collector 12 and the positive electrode connection member 11 after the fuse region 12c has been fused.

In the present embodiment, the first connection region 12a of the positive electrode current collector 12 is positioned closer to the sealing plate 2 than the second connection region 12b is. With this configuration, the end portion of the electrode body 3 adjacent to the sealing plate 2 can be positioned closer to the sealing plate 2. As a result, the capacity of the secondary battery can be further increased.

The present disclosure has been described above with reference to the preferred embodiment, but such description is not limited and various modifications can be made, needless to say.

For example, in the above-described embodiment, the fuse region (the thinner portion) 12c is disposed outside the positive electrode external terminal 10 in the longitudinal direction of the sealing plate 2, but may be disposed at a position identical to that of the positive electrode external terminal 10.

For example, in a case where the fuse region 12c is positioned below the positive electrode external terminal 10, the through-hole 11a of the positive electrode connection member 11 is positioned below the positive electrode external terminal 10. Thus, a location where the positive electrode current collector 12 is connected to the positive electrode connection member 11 is a region other than the fuse region 12c (e.g., a region outside the positive electrode external terminal 10).

In a case where the fuse region 12c is positioned at a position shifted from the position of the positive electrode external terminal 10 in a width direction (a direction perpendicular to the longitudinal direction) of the sealing plate 2, the positive electrode current collector 12 may be connected to the positive electrode connection member 11 at the fuse region 12c as in the case shown in FIG. 9B.

In any case, it may only be required that the fuse region 12c is provided on the current path from the first connection region 12a to the second connection region 12b. Thus, it may only be required that the fuse region 12c is positioned at a position identical to that of the positive electrode external terminal 10 or outside the positive electrode external terminal 10 in the longitudinal direction of the sealing plate 2.

In the above-described embodiment, the example where the fuse region 12c includes the annular thinner portion has been described. However, the shape etc. of the fuse region 12c are not particularly limited as long as the fuse region 12c is fused when overcurrent flows in the positive electrode current collector 12. For example, the fuse region 12c may include a circular thin portion or a slit.

In the above-described embodiment, the positive electrode external terminal 10 and the positive electrode connection member 11 are formed as separate members, but may be integrally formed of the same member.

As shown in FIG. 2, the positive electrode current collector 12 may be covered with the insulating cover member 15 in the second connection region 12b. This can prevent short-circuit of the positive electrode current collector 12 and the electrode body 3 due to contact therebetween. Note that as shown in FIG. 4, the cover member 15 is provided with ribs 15a. With this configuration, the cover member 15 can be fixed to the second insulating member 14 in such a manner that the ribs 15a are fitted in the openings 14e provided at the second insulating member 14.

In the above-described embodiment, the fuse region 12c is provided at the positive electrode current collector 12, but may be provided at the negative electrode current collector 22.

In the above-described embodiment, the example where the two electrode bodies 3a, 3b are housed in the exterior body 1 has been described. However, one electrode body or three or more electrode bodies may be used.

The type of secondary battery in the present embodiment is not particularly limited. For example, the present disclosure can be applied to a non-aqueous electrolyte secondary battery such as a lithium ion secondary battery.

DESCRIPTION OF REFERENCE CHARACTERS

1 Exterior Body
2 Sealing Plate
2a Through-Hole
2b Liquid Injection Hole
3, 3a, 3b Electrode Body
4 Positive Electrode Plate
4a, 4b Positive Electrode Current Collector Tab
5 Negative Electrode Plate
5a, 5b Negative Electrode Current Collector Tab
6 Electrode Body Holder
10 Positive Electrode External Terminal
10a Protruding Portion
11 Positive Electrode Connection Member
11a Through-Hole
11b Protrusion
12 Positive Electrode Current Collector
12a First Connection Region
12b Second Connection Region
12c Fuse Region
12d Step Portion 12e Through-Hole
12f Cutout Portion
13, 23 First Insulating Member
14, 24 Second Insulating Member
14a Through-Hole
14b Opening
14c Wall Portion
14d, 14e Opening
15 Cover Member
15a Rib
16 Fuse Cover
16a Through-Hole
16b Protrusion
16c Rib
20 Negative Electrode External Terminal
21 Negative Electrode Connection Member
22 Negative Electrode Current Collector
22a First Connection Region
22b Second Connection Region
30 Sealing Member
31 Gas Discharge Valve
40, 50 Welding Location
60 Zip Tie
100 Secondary Battery
200 Battery Pack

The invention claimed is:

1. A secondary battery comprising:
an electrode body including a positive electrode plate and a negative electrode plate;
an exterior body having an opening and housing the electrode body;
a sealing plate sealing the opening;
an external terminal provided outside the sealing plate;
a connection member provided inside the sealing plate and connected to the external terminal;
a current collector disposed inside the sealing plate and connected to the connection member; and
a current collector tab connected to the positive electrode plate or the negative electrode plate at an end portion of the electrode body adjacent to the sealing plate, wherein:
the current collector includes, along a longitudinal direction of the sealing plate,
a first connection region connected to the current collector tab,
a second connection region connected to the connection member, and
a fuse region provided on a current path from the first connection region to the second connection region,
the first connection region is positioned inside the external terminal in the longitudinal direction of the sealing plate,
the fuse region is positioned outside the external terminal in the longitudinal direction of the sealing plate, and
the fuse region includes an annular thinner portion having a thickness, in a stacking direction of the sealing plate, the connection member and the current collector, smaller than other regions of the current collector, and the current collector is connected to the connection member at the thinner portion.

2. The secondary battery of claim 1, wherein
an insulating fuse cover is disposed between the current collector and the connection member at least in a vicinity of the fuse region.

3. The secondary battery of claim 2, wherein
the fuse cover has a protrusion, and
the protrusion is fixed to the current collector by allowing the protrusion to penetrate a through-hole of the current collector and a tip of the protrusion to be crimped.

4. The secondary battery of claim 1, wherein
the current collector has a step portion between the first connection region and the second connection region, and
the first connection region is positioned closer to the sealing plate than the second connection region is.

5. The secondary battery of claim 1, wherein
the external terminal and the connection member are integrally formed of an identical member.

6. The secondary battery of claim 1, wherein
the current collector is covered with an insulating cover member in the second connection region.

* * * * *